United States Patent
Dybdahl et al.

(10) Patent No.: US 11,603,758 B2
(45) Date of Patent: Mar. 14, 2023

(54) APPARATUS FOR PROVIDING A FLUID SAMPLE IN A WELL

(71) Applicant: Expro Petrotech AS, Haugesund (NO)

(72) Inventors: Bjorn Dybdahl, Haugesund (NO); Trond Kirkerod, Stathelle (NO)

(73) Assignee: Expro Meters, Inc., Wallingford, CT (US)

( * ) Notice: Subject to any disclaimer, the term of this patent is extended or adjusted under 35 U.S.C. 154(b) by 36 days.

(21) Appl. No.: 16/750,709

(22) Filed: Jan. 23, 2020

(65) Prior Publication Data
US 2020/0157936 A1 May 21, 2020

Related U.S. Application Data

(62) Division of application No. 15/514,176, filed as application No. PCT/NO2015/050178 on Sep. 30, 2015, now abandoned.

(30) Foreign Application Priority Data

Oct. 3, 2014 (NO) .................................. 20141190

(51) Int. Cl.
*E21B 49/08* (2006.01)
*G01N 1/20* (2006.01)
*G01N 30/20* (2006.01)

(52) U.S. Cl.
CPC ....... *E21B 49/0815* (2020.05); *G01N 1/2035* (2013.01); *G01N 30/20* (2013.01); *E21B 49/0875* (2020.05); *G01N 2001/2057* (2013.01)

(58) Field of Classification Search
CPC ....... E21B 49/081; E21B 49/10; E21B 49/088
See application file for complete search history.

(56) References Cited

U.S. PATENT DOCUMENTS

| | | | |
|---|---|---|---|
| 2,459,148 A * | 1/1949 | Christensen | B64D 37/005 251/57 |
| 4,739,654 A | 4/1988 | Pilkington | |
| 4,893,505 A | 1/1990 | Marsden | |
| 5,230,244 A * | 7/1993 | Gilbert | E21B 49/10 73/152.17 |

(Continued)

FOREIGN PATENT DOCUMENTS

| | | |
|---|---|---|
| GB | 2276608 B | 1/1996 |
| WO | 2009151449 A1 | 12/2009 |
| WO | 2013122477 A1 | 8/2013 |

*Primary Examiner* — Theodore N Yao
(74) *Attorney, Agent, or Firm* — Getz Balich LLC (57) ABSTRACT

Apparatus and a method are provided for bringing a well-fluid sample in a well through a sampling device which is in fluid communication with the apparatus. The apparatus includes: a dump chamber for receiving the well-fluid sample; a first hydraulic piston arranged in a first cylinder housing; a second hydraulic piston arranged in a second cylinder housing; a piston rod for mechanically connecting the first piston to the second piston to form a piston arrangement, the dump chamber being defined by the first piston and a portion of the first cylinder housing. The apparatus further includes at least one holding device arranged to switch between an active position, in which the piston arrangement is held fixed against movement, and an inactive position, in which the piston arrangement is allowed a movement relative to the cylinder housings.

7 Claims, 10 Drawing Sheets

(56) References Cited

U.S. PATENT DOCUMENTS

| | | | |
|---|---|---|---|
| 5,303,775 | A | 4/1994 | Michaels |
| 6,334,489 | B1 | 1/2002 | Shwe |
| 6,386,017 | B1 | 5/2002 | Hewitt |
| 6,437,326 | B1 | 8/2002 | Yamate |
| 7,384,453 | B2 | 6/2008 | Bostrom |
| 8,146,415 | B2 | 4/2012 | Cartellieri |
| 2002/0084072 | A1 | 7/2002 | Bolze |
| 2003/0042021 | A1 | 3/2003 | Bolze |
| 2004/0160858 | A1 | 8/2004 | Ciglenec |
| 2004/0216874 | A1* | 11/2004 | Grant ............... E21B 49/082 166/264 |
| 2005/0115716 | A1* | 6/2005 | Ciglenec ........... E21B 49/081 166/373 |
| 2005/0150287 | A1 | 7/2005 | Carnegie |
| 2006/0198742 | A1 | 9/2006 | DiFoggio |
| 2007/0119587 | A1 | 5/2007 | Shammai |
| 2008/0066537 | A1* | 3/2008 | Hegeman ........... E21B 49/081 73/152.28 |
| 2010/0175873 | A1 | 7/2010 | Milkovisch |
| 2011/0031972 | A1 | 2/2011 | Pelletier |
| 2011/0114310 | A1* | 5/2011 | Ross ................. E21B 49/10 166/250.17 |
| 2011/0277984 | A1 | 11/2011 | Woie |
| 2012/0018152 | A1* | 1/2012 | Zuilekom ........... E21B 49/084 166/264 |
| 2013/0014576 | A1 | 1/2013 | Pelletier |
| 2015/0075802 | A1 | 3/2015 | Cowman |
| 2016/0215617 | A1* | 7/2016 | Samec ............... G01N 33/287 |

\* cited by examiner

APPARATUS FOR PROVIDING A FLUID SAMPLE IN A WELL

This application is a divisional of U.S. patent application Ser. No. 15/514,176 filed Mar. 24, 2017, which is a national stage application of PCT Patent Appln. No. PCT/NO2015/050178 filed Sep. 30, 2015, which claims priority to NO Patent Appln. No. 20141190 filed Oct. 3, 2014, which are herein incorporated by reference.

BACKGROUND OF THE INVENTION

1. Technical Field

The present invention relates to an apparatus and a method for sampling a fluid in a petroleum well. It relates more particularly to an apparatus and a method for bringing a well-fluid sample in a well into or through a sampling device which is in fluid communication with the apparatus.

The well-fluid sample may be a sample that is taken in connection with a drilling operation, a test production or a production well, or in connection with a shutdown of a production well.

The sampling device may be a sample container for collecting a fluid sample, a measuring device including at least one sensor, or a combination of these. The fluid sample is thus brought into or through the sampling device. For the sake of simplicity, the term through will be used in what follows, also for the cases in which the sample is brought into the sampling device.

The at least one sensor of the measuring device may comprise, but is not restricted to, a chromatograph of the gas-chromatograph, liquid-chromatograph, or ion-chromatograph type, or any combination of these, an optical device based on IR light or UV light, an atomic-absorption device, a mass spectrometer, a density sensor, a permeability sensor, a pH-measuring unit, a pressure sensor, a temperature sensor or a combination of two or more thereof. Depending on the type or types of sensors used, the properties of the fluid related to one or a combination of chemical composition, chemical properties and/or physical properties may be revealed.

Driving a well-fluid sample through a measuring device is a well-known technique.

2. Background Information

The publication U.S. Pat. No. 7,384,453 B2 discloses a number of different driving devices for driving a fluid sample through a chromatograph by means of overpressure.

The publication U.S. Pat. No. 4,739,654 discloses a chromatograph in which a formation fluid is brought into a chromatograph sample chamber. The formation fluid in said sample chamber is then driven through a chromatograph.

The publication U.S. Pat. No. 8,146,415 B2 (US 2009/294175) discloses a downhole measuring apparatus such as a gas chromatograph. A fluid sample is driven through the measuring apparatus from an inlet portion upstream of the measuring apparatus to an outlet portion downstream of the measuring apparatus. The outlet portion may be in fluid communication with a flow-control device which, in one embodiment, comprises a piston-and-cylinder arrangement. By controlling the position of the piston in the arrangement, a dump chamber is provided, which is arranged to receive the fluid sample which has been driven through the measuring apparatus.

The publication US 2011/0277984 discloses a data-gathering device for a well pipe. The data-gathering device is connected to the well pipe and is arranged for the in-situ gathering of formation data from the borehole wall of a well in an open borehole. The data-gathering device includes a movable measuring probe with a measuring sensor, the measuring probe being arranged to be movable at least out from the well pipe to establish contact with the borehole wall. The measuring probe is moved by means of an activation device. The data-gathering device includes at least one suction chamber which is hydraulically connected to the measuring probe, and which is arranged to carry out non-motorized suction of contaminations from the borehole wall before the gathering of formation data is initiated. The suction chamber is connected to a release means for controlled activation of said suction. The measuring probe, the activation device and the suction chamber are arranged hydraulically isolated from the inside of the well pipe.

The publication U.S. Pat. No. 6,437,326 B1 discloses fibre-optic measuring of a well fluid. The measuring takes place through an optical window which separates the fibre from a fluid chamber. The fluid chamber includes a floating piston which separates the well fluid from a control fluid. By influencing the pressure of the control fluid, the piston is moved so that the optical window is exposed to one of the well fluid or the control fluid.

The publication U.S. Pat. No. 5,303,775 discloses a method and an apparatus for providing a sample of a phase-intact pore fluid from an underground formation for subsequent analysis, by means of an instrument for formation testing. The apparatus includes a replaceable sampling tank with an internal fluid chamber. In use, a balanced pressure condition is established between said internal fluid chamber of said sample tank and the fluid in the borehole at the formation depth. The pore fluid is transferred from said formation to the sample container by bidirectional pumping of the pore fluid while the pressure of the pore fluid is controlled within a predetermined pressure range to prevent phase separation of the pore fluid.

US 2002/0084072 discloses how a formation-fluid sample from a well is carried into and stored in a sample chamber by the control of inlet and outlet valves. The sample chamber containing the sample is then brought out of the well so that the sample can be analysed.

NO 20120163 belonging to the present applicant discloses an apparatus and a method for collecting a reservoir sample in a well, wherein the reservoir sample is brought into a tracer sample chamber.

WO 2013/147616 discloses an apparatus for bringing a well-fluid sample past a sensor and into a sample chamber. The apparatus includes a piston arrangement which is displaceably arranged in an actuator cylinder and the sample chamber.

US 2013/0014576, U.S. Pat. Nos. 6,334,489, 4,893,505, US 2010/175873, US 2003/042021, US 2012/018152, GB 2276608, US 2006/198742, US 2004/160858, US 2005/150287 and WO 2009/151449 all disclose apparatuses and/or methods for collecting samples or data from formations in the ground.

Common features of the above-mentioned prior art are that the apparatuses are relatively extensive and complicated in their structures and many of them include pumping devices and/or a plurality of valves requiring control.

When pumps are used, energy supply is required, either from the well surface or from an energy source placed in association with the apparatus.

The environment in a well can be harsh with high temperatures and aggressive fluids. A complicated apparatus is more prone to damage and malfunction than an apparatus of simple construction and with relatively few components that require control.

The invention has for its object to remedy or reduce at least one of the drawbacks of the prior art or at least provide a useful alternative to the prior art.

SUMMARY OF THE INVENTION

The object is achieved through the features which are specified in the description below and in the claims that follow.

According to a first aspect of the present invention, an apparatus for bringing a well-fluid sample in a well through a sampling device which is in fluid communication with the apparatus is provided, the apparatus comprising: a dump chamber for receiving the well-fluid sample; a first hydraulic piston arranged in a first cylinder housing; a second hydraulic piston arranged in a second cylinder housing; a piston rod for mechanically connecting the first piston to the second piston to form a piston arrangement. The characterizing feature of the apparatus is that the dump chamber is defined by the first piston and a portion of the first cylinder housing, and that the apparatus further comprises at least one holding device which is arranged to switch between an active position, in which the piston arrangement is held fixed against movement, and an inactive position, in which the piston arrangement is allowed a movement relative to the cylinder housings, said movement of the piston arrangement being brought about by means of a well fluid which, in a position of application, is in fluid communication with the second hydraulic piston so that the movement brings about an increase in a volume of the dump chamber when the holding device is in its inactive position. When the volume of the dump chamber is increased in this way, the well fluid will be sucked through the sampling device and into the dump chamber.

The piston rod is configured to bring about a 1:1 movement of the second piston and the first piston. Thus, the volume of the dump chamber is influenced into increasing when the driving fluid is allowed to displace the second piston towards the first cylinder housing. When the volume of the dump chamber is being increased, the well fluid sample will, as mentioned, be sucked through the sampling device which is in fluid communication with the dump chamber.

The holding device is thus a control device. The purpose of the control device is to provide a selectively releasable holding or braking device so that the second piston and thereby the first piston as well, are prevented from being moved before it is desirable to have the well-fluid sample carried into or through the sampling device. The control device, which will be referred to as a holding device in what follows, may typically be a valve as will be explained in what follows. Alternatively, the holding device may be a selectively releasable mechanical holding device which is configured to lock the assembly of the second piston, the piston rod and the first piston, thus the piston arrangement, in an initial position in which the volume of the dump chamber is at a minimum, i.e. in a position in which the second piston is at a maximum distance from the first cylinder housing.

The well fluid entering the apparatus from the well is thus a driving fluid for the piston arrangement.

The area of a piston face of the first piston may be larger than the area of the piston face of the second piston. By the piston faces are meant, here, the faces of the pistons that are facing away from each other. In an alternative embodiment, the area of the piston face of the first piston may be smaller than the area of the piston face of the second piston. In yet another alternative embodiment, the area of the piston face of the first piston may be equal to the area of the piston face of the second piston.

The first cylinder housing may be provided with an end plug. The end plug, a piston face of the first piston and a portion of the first cylinder housing define a first cylinder-housing chamber which is arranged to accommodate a pressurized fluid, wherein the holding device is a valve arranged for selectively bleeding off the pressurized fluid. In those cases in which the piston face of the first piston is larger than a piston face of the second piston, the pressurized fluid must be bled off towards a pressure which is lower than the well pressure, for example into a vacuum container or to a place in the well with a lower well pressure, such as to the surface of the well.

In one embodiment, the second piston may be in continuous fluid communication with the well fluid. By continuous is meant, in this connection, that the well fluid is allowed to flow towards the piston as soon as the apparatus is run into the well, when the apparatus is in its position of application, that is.

As an alternative to letting the second position be in continuous fluid communication with the well fluid, the second cylinder housing may be provided with an end plug, wherein the end plug, the piston face of the second piston and a portion of the second cylinder housing define a second cylinder-housing chamber which is provided with the holding device which may be in the form of a valve which, in its active position, shuts off fluid communication of well fluid into the second cylinder-housing chamber and, in its inactive position, allows fluid communication of well fluid into the second cylinder-housing chamber.

In an embodiment in which the piston face of the first piston is smaller than the piston face of the second piston, the first piston may thus be in continuous fluid communication with the well fluid. Having to bring a pressurized fluid into the first cylinder-housing chamber before the apparatus is run into the well is thereby avoided.

As an alternative to letting the holding device be formed of a valve which will be able to allow and shut off fluid communication into or out of the second cylinder-housing chamber and the first cylinder-housing chamber, respectively, the control means may include a locking means arranged in association with the second cylinder housing and configured for selective, releasable engagement with at least one of the piston rod and the second piston when the second piston is at the greatest possible distance from the first cylinder housing. By the use of such a locking means, both cylinder houses can be in continuous fluid communication with the well fluid. However, this presupposes that the area of the piston face of the first piston being smaller than the area of the piston face of the second piston, so that the force from the second piston, which contributes to increasing the volume of the dump chamber, is greater than the opposite force from the first piston.

In one embodiment, the piston rod may have a cross-sectional area which is smaller than the area of a piston face of the first piston and the area of a piston face of the second piston, and a chamber wall with an opening complementarily adapted to the piston rod provides a partition between the dump chamber and a partition-wall chamber defined by a portion of the piston rod, the second cylinder housing and the second piston. In such an embodiment, at least the first cylinder housing may be provided with an end plug, wherein the end plug, the piston face of the first piston and a portion of the first cylinder housing define a first cylinder-housing chamber which is arranged to accommodate a pressurized fluid, and the holding device is a valve arranged for the selective bleed-off of the pressurized fluid, the valve, in its active position, shutting off fluid communication of the pressurized fluid out of the first cylinder-housing chamber and, in its inactive position, allowing fluid communication of the pressurized fluid out of the first cylinder-housing chamber, and a pressure in the partition-wall chamber is lower than atmospheric pressure at least when a volume of the dump chamber is at a minimum. In what follows, said pressure in the partition-wall chamber will also be referred to as underpressure.

When the valve in the end plug is opened, the underpressure in the partition-wall chamber will contribute to moving the piston arrangement in a direction such that the volume of the dump chamber increases. As mentioned, the piston arrangement comprises the second piston, the piston rod and the first piston.

The second cylinder housing may be provided with an end plug to control the inflow of well fluid into the second cylinder-housing chamber. Such an end plug is provided with a holding device in the form of a valve and a fluid channel allowing selective fluid communication between the well and the second cylinder-housing chamber. In its active position, the valve will shut off fluid communication of well fluid into the second cylinder-housing chamber and, in its inactive position, allow fluid communication of well fluid into the second cylinder-housing chamber. The apparatus may thus be provided with two valve devices. In one embodiment, the valve devices may be controlled independently of each other.

In a second aspect of the invention, a system for collecting a well sample from a well is provided, the system comprising the apparatus according to the first aspect of the invention and a sampling device comprising a measuring device provided with at least one sensor.

The measuring device may typically include a chromatograph of a kind mentioned initially. Alternatively, or additionally, the measuring device may include one or more other sensors of the kinds mentioned initially.

Alternatively to, or in addition to, the measuring device, the sampling device may comprise a sample container which is arranged to isolate a well-fluid sample so that it can be brought out of the well for subsequent analyses.

Such a sample container may be a tracer sample chamber which, by means of valves, is arranged to isolate a fluid sample which is drawn from the well by means of the dump chamber, and the sampling device, the valves and a fluid line upstream of the tracer sample chamber are provided with an internal surface which consists of a material which is practically non-reactive in relation to substances that are carried from the well into the tracer sample chamber, so that trace elements that have been carried into the tracer sample chamber can be brought out of the tracer sample chamber when the well-fluid sample is analysed.

Such a tracer sample chamber is suitable for collecting well-fluid samples which are analysed for, inter alia, trace elements which occur naturally in the reservoir fluid. A person skilled in the art will know that such trace elements may occur in very small concentrations and are typically measured in ppb (parts per billion). To achieve a satisfactory result it is very important that the trace elements which are carried into the sample chamber may, to the greatest possible degree, also be released from, i.e. be brought out of, the tracer sample chamber when the sample is to be analysed. The analytical results will thus be more reliable with respect to the tracer content of the reservoir.

In what follows, the sample container will be referred to as the trace-element sample chamber. It will be understood that a tracer sample camber is also suitable when collecting a "standard" well-fluid sample that is to be analysed for other than that for trace elements.

The sampling device may include a measuring device which is placed upstream of a tracer sample chamber. By means of valves, the tracer sample chamber is arranged to be isolated from the measuring device and from the dump chamber which is placed downstream of both the measuring device and the tracer sample chamber. The valves are placed at an inlet portion and at an outlet portion of the tracer sample chamber. The valves are arranged to be controllable between an open position and a closed position and are of a kind known per se.

In a special embodiment, the tracer sample chamber includes a portion of a fluid line extending between an outlet portion of the sampling device or the measuring device and the dump chamber.

According to a third aspect of the present invention, there is provided a method for bringing a well-fluid sample through a sampling device in a well by means of the apparatus according to the first aspect of the invention, the method comprising: arranging the dump chamber with a smallest possible volume and then activating the holding device of the apparatus; bringing the apparatus together with the sampling device to a desired location in the well; and initiating movement of the piston arrangement by deactivating the at least one holding device so that a well fluid sets the piston arrangement in motion in order thereby to increase the volume of the dump chamber and suck the well-fluid sample through the sampling device.

The method may further comprise stopping the movement of the piston arrangement by reactivating the holding device which includes a valve, so that well fluid is no longer sucked via the sampling device and into the dump chamber. Such a stopping of the movement of the piston arrangement may be temporary. By setting the piston arrangement in motion again, while the apparatus is in the same location or after the apparatus has been carried to a new location in the well, a new well-fluid sample will be sucked through the sampling device and into the dump chamber.

The dump chamber may be arranged with said smallest possible volume before the apparatus is run into the well.

The invention is defined by the independent claims. The dependent claims define advantageous embodiments of the invention.

BRIEF DESCRIPTION OF THE DRAWINGS

In what follows, an example of a preferred embodiment is described, which is visualized in the accompanying drawings, in which.

DETAILED DESCRIPTION OF THE INVENTION

In what follows, positional specifications such as "over", "under", "upper", "lower", "right" and "left" relate to what is shown in the figures.

Like or corresponding elements may be indicated by the same reference numeral in the different figures. For the sake of clarity, the reference numerals of some of the elements may have been left out in some of the figures.

In the figures, the reference numeral 1 indicates an apparatus according to the present invention.

The apparatus 1 includes a first hydraulic piston 11 movably arranged in a first cylinder housing 13 and a second hydraulic piston 15 movably arranged in a second cylinder housing 17. The first hydraulic piston 11 is mechanically connected to the second hydraulic piston 15 by means of a piston rod 19. The piston rod 19 is thus a connecting means between the first hydraulic piston 11 and the second hydraulic piston 15.

The apparatus 1 is in fluid communication with a sampling device 3 which is provided with an inlet portion 5 and an outlet portion 7. The inlet portion 5 is in fluid communication with a well fluid, and the outlet portion 7 is in fluid communication, via a fluid line 8, with a dump chamber 9 in the apparatus 1. The fluid line 8 is connected to the apparatus 1 by means of a coupling device 8' which is attached, for example by means of a threaded connection, to a cut-out in the second cylinder housing 17. The cut-out is in fluid communication with the dump chamber 9 as indicated in the figures.

The sampling device 3 may be a measuring device 3 comprising at least one sensor. In an alternative embodiment, the sampling device 3 may be a sample chamber, for example a tracer sample chamber. In yet another alternative embodiment, the sampling device 3 may include both a measuring device and a tracer sample chamber. In a particular embodiment, the sampling device 3 includes the measuring device with the at least one sensor, whereas the tracer sample chamber is arranged in, for example defined by, a portion of the fluid line 8.

Figure 1A:
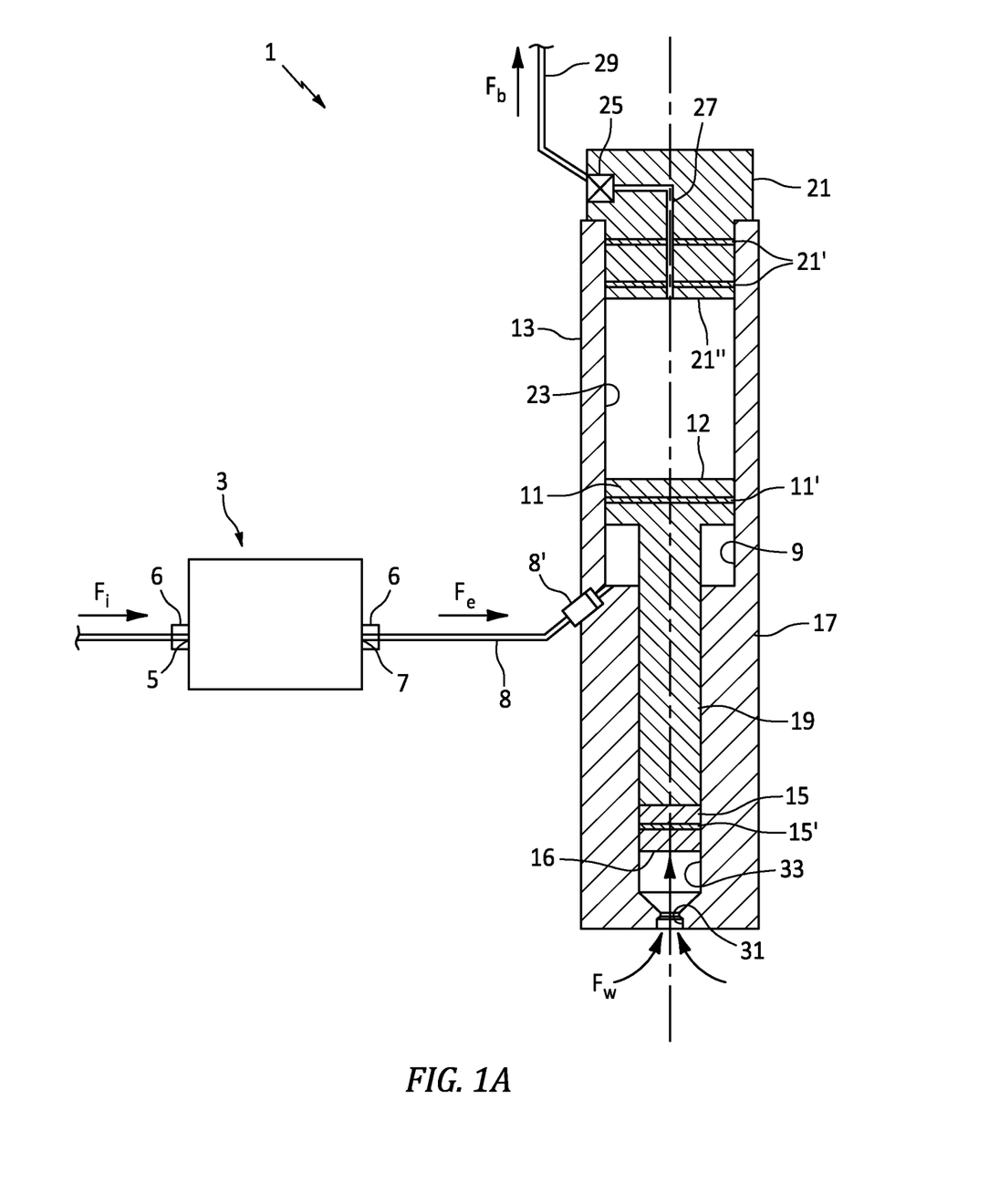
FIG. 1A shows an apparatus according to the present invention just after the piston arrangement of the apparatus has been set in motion by the well pressure and a dump chamber in the apparatus is close to a smallest volume.
Figure 1B:
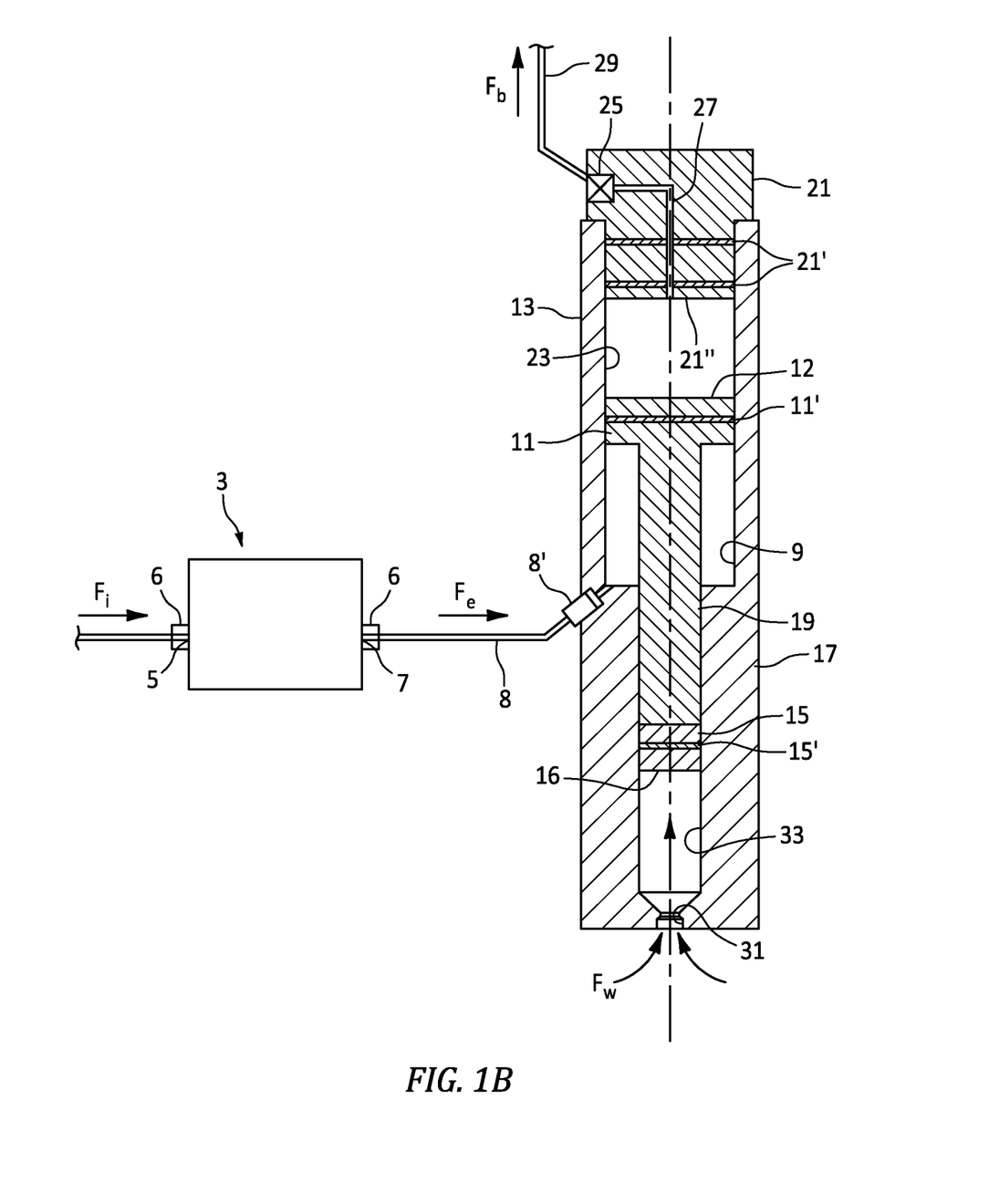
FIG. 1B shows the apparatus of FIG. 1A, but the piston arrangement has been driven by the well pressure so that the volume of the dump chamber has been further increased.
Figure 1C:
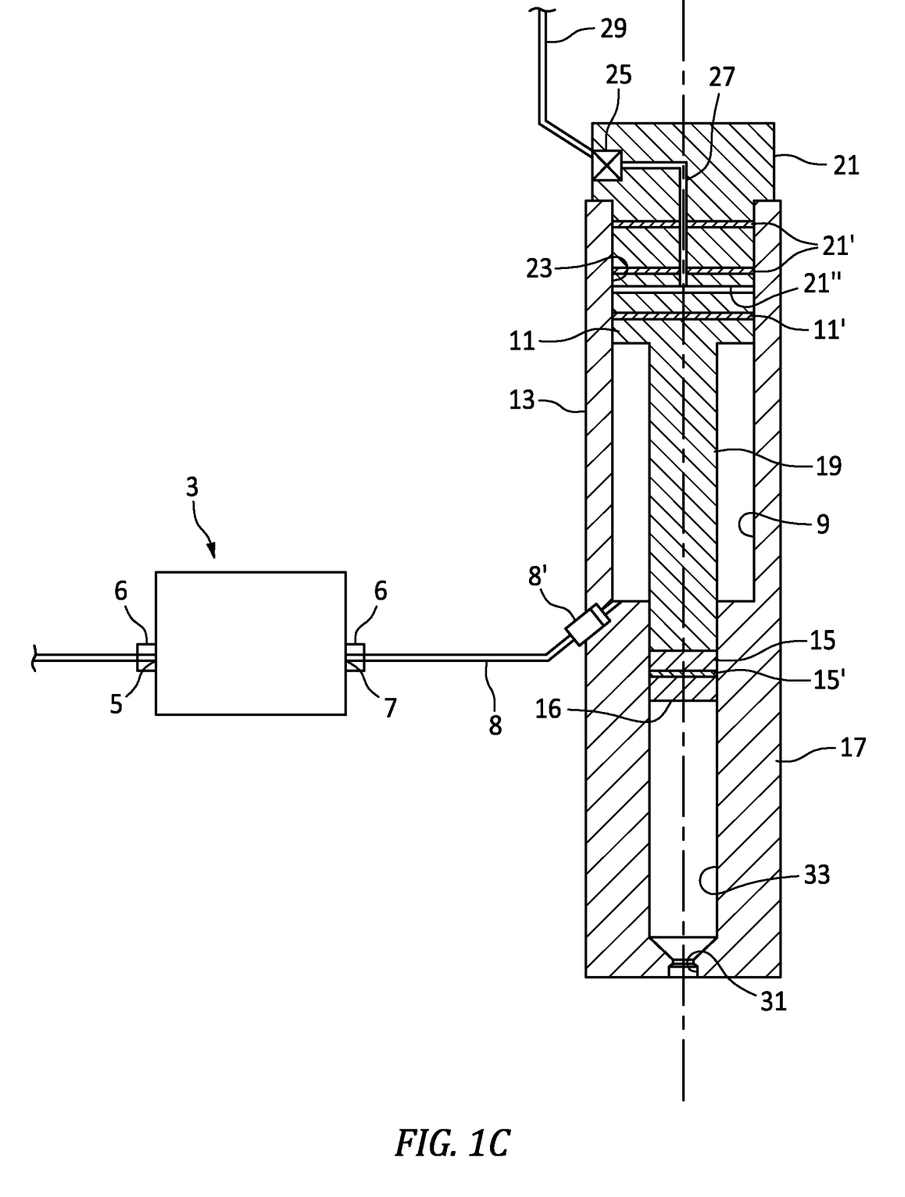
FIG. 1C shows the apparatus of FIGS. 1A and 1B, the piston arrangement being at its end position and the sucking-in of a well-fluid sample into the dump chamber having ceased.

In the embodiment in which the sampling device 3 is a tracer sample chamber, this is provided with valves 6 arranged for example at the inlet portion 5 and the outlet portion 7, as shown in FIGS. 1A-C. In the embodiment in which the tracer sample chamber is arranged in a portion of the fluid line 8, the fluid line 8 is provided with valves (not shown) arranged at the outlet portion 7 and at the coupling device 8', for example.

The description that follows will be directed, to a great degree, towards an embodiment in which the sampling device 3 is a measuring device comprising at least one sensor. However, it will be understood that the apparatus 1 according to the invention could just as well be used for a sampling device including a sample container such as said tracer sample chamber, or a combination of the measuring device and the sample container. The point of the invention is that the well-fluid sample is sucked into and through the sampling device 3 by means of the apparatus 1 according to the present invention.

The dump chamber 9 is defined by the first piston 11, the first cylinder housing 13 and the portion of the piston rod 19 that is in the first cylinder housing 13 at any time.

To provide a fluid seal between the pistons 11, 15 and the respective cylinder housings 13, 17, each of the pistons 11, 15 is provided with a seal 11' and 15', respectively.

In the embodiment shown in FIGS. 1A-1C, the area of a piston face 12 of the first piston 11 is larger than the area of a piston face 16 of the second piston 15. In said figures, the piston rod 19 has a cross-sectional area which is equal to the cross-sectional area (and the piston face 16) of the second piston 15.

In an upper end portion, the first cylinder housing 13 is provided with an end plug 21 attached to it by means of a threaded connection. The end plug 21 is provided with seals 21' to be able to form a fluid-tight connection between the first cylinder housing 13 and the end plug 21. The end plug 21, piston face 12 of the first piston 11 and the portion of the cylinder housing 13 which at all times is defined by said piston face 12 and an end face 21" of the end plug 21, define a first hydraulic chamber 23.

The first hydraulic chamber 23 is arranged to accommodate a pressurized fluid such as a hydraulic liquid. The hydraulic liquid is carried into the chamber 23 via the end plug 21.

The end plug 21 is further provided with a holding device in the form of a valve 25 which is arranged to be controllable both ways between an open position and a closed position. The control of the valve 25 can be performed by means of means that will be well known to a person skilled in the art.

The valve 25 is in fluid communication with the first hydraulic chamber 23 via a fluid channel 27 and in fluid communication with a receiving unit, not shown, for hydraulic liquid from the hydraulic chamber 23 via an outlet line 29. For the embodiment shown, the receiving unit may be, for example, a container, not shown, having a pressure, when filled with the fluid from the hydraulic chamber 23, lower than an ambient pressure in the well. Alternatively, the receiving unit may for example be somewhere higher up in the well or outside the well so that the fluid may selectively be bled off from the hydraulic chamber 23.

The purpose of the valve 25 is thus to allow the hydraulic liquid to be bled off from the hydraulic chamber 23.

In a lower end portion, the second cylinder housing 17 is provided with an opening 31 for communication of well fluid between the well and the second cylinder housing 17.

A second hydraulic chamber 33 is thus defined by the piston face 16 of the second piston 15, the portion of the cylinder housing 17 which at all times is defined by said piston face 16, and the opening 31.

In the embodiment shown in FIGS. 1A-1C, the opening 31 is a bore through a lower end portion of the second cylinder housing 17. As soon as the apparatus 1 is run into the well, the well fluid will be carried towards the piston face 16 of the second piston 15. In consequence of the pressure from the well fluid, the piston 15 will exert an upward force as is shown in the figures. To prevent the piston arrangement 15, 19, 11 from being moved in an uncontrolled manner, the pressure of the fluid in the first hydraulic chamber 23 must be of such a magnitude that a downward force exerted by the first piston 11 is larger than the opposite force in consequence of the pressure of the well fluid in the second hydraulic chamber 33. Thus, the necessary pressure that will have to be supplied to the first hydraulic chamber 23 depends on the maximum well pressure to which the apparatus 1 is exposed to in the relevant situation of application.

Normally, fluid at the desired pressure will be supplied to the hydraulic chamber 23 of the apparatus 1 before the apparatus 1 is run into the well. But it is conceivable that the hydraulic chamber 23 is pressurized as the apparatus 1 is being run into the well. However, this requires fluid communication with the surface or a pump/valve device from a possible container which is arranged to be selectively put into fluid communication with the chamber 23. Especially the latter alternative with a pump/valve device will complicate the apparatus 1 and is thus a less attractive solution.

FIG. 1A shows the apparatus 1 in its position of application just after the valve 25 in the end plug 21 has been brought from the closed position to the open position. The valve 25 is of a kind known per se, which is arranged to be remotely operated, for example from a vessel connected to the well. When the valve 25 is opened, pressurized fluid from the first hydraulic chamber 23 will be bled off via the fluid channel 27 and the outlet line 29 and further to the receiving unit not shown. The fluid flow out of the first hydraulic chamber 23 is indicated by an arrow $F_b$.

The pressure in the well fluid flowing in through the opening 31 of the second cylinder housing 17 and into the second hydraulic chamber 33 causes the piston arrangement 15, 19, 11 to move upwards in the cylinder housings 17, 13. The inflow of well fluid through the opening is illustrated by arrows $F_w$.

In consequence of the movement of the piston arrangement 15, 19, 11, the volume of the dump chamber 9 increases. In consequence of this volume increase, well fluid will be sucked/drawn or, depending on the volume-increase rate of the dump chamber 9 in relation to the entering rate of the well-fluid flow $F_i$, flow into and through the sampling device 3 and into the dump chamber 9. The flow of a well-fluid sample into the sampling device 3 is illustrated by the arrow $F_i$.

In an embodiment in which the sampling device 3 is a measuring device comprising at least one sensor, the flow of "exhaust fluid", i.e. fluid that has passed the measuring device 3, is illustrated by an arrow $F_e$. The exhaust-fluid flow $F_e$ may be identical to $F_i$. But if the measuring device 3 is of the gas-chromatograph type, for example, $F_e$ will be a mixture of the well-fluid flow $F_i$ and a carrier gas which is supplied from a carrier-gas container, not shown, which is in fluid communication with the measuring device 3, as will be known to a person skilled in the art. FIG. 1B shows the apparatus of FIG. 1A after the piston arrangement 15, 19, 11 has moved about half the stroke length in the cylinder housings 17, 13.

The piston arrangement 15, 19, 11 will be moved upwards as long as the bleed-off of the fluid pressure in the first hydraulic chamber 23 is maintained, i.e. as long as the valve 25 is open and as long as the downward force from the first piston 11 is smaller than the opposite force from the second piston 15.

When the desired measurement has been achieved, the valve 25 is closed. By opening the valve 25 again after a certain time, either with the apparatus 1 in the same position in the well or after the apparatus 1 has been moved to another position, for example higher or lower in the well, another measurement can be carried out. Such "stepped" measurements may be repeated one or more times until the dump chamber 9 has reached its maximum volume as shown in FIG. 1C where the fluid flows $F_b$, $F_w$, $F_i$ and $F_e$ have ceased.

A person skilled in the art will know that in those cases in which the sampling device 3 comprises a measuring device with at least one sensor, it may be very important that the fluid flow $F_i$ into and through the at least one sensor of the measuring device 3 takes place at a controlled, stable flow rate.

Such a controlled, stable flow rate is achieved by controlling the degree of opening of the valve 25. It will therefore be understood that the term "open valve" means that the position of the valve is not necessarily in its fully open position, but in a position different from fully closed, so that the desired flow rate of the fluid flow $F_i$ into and through the measuring device 3 is achieved.

Figure 2A:
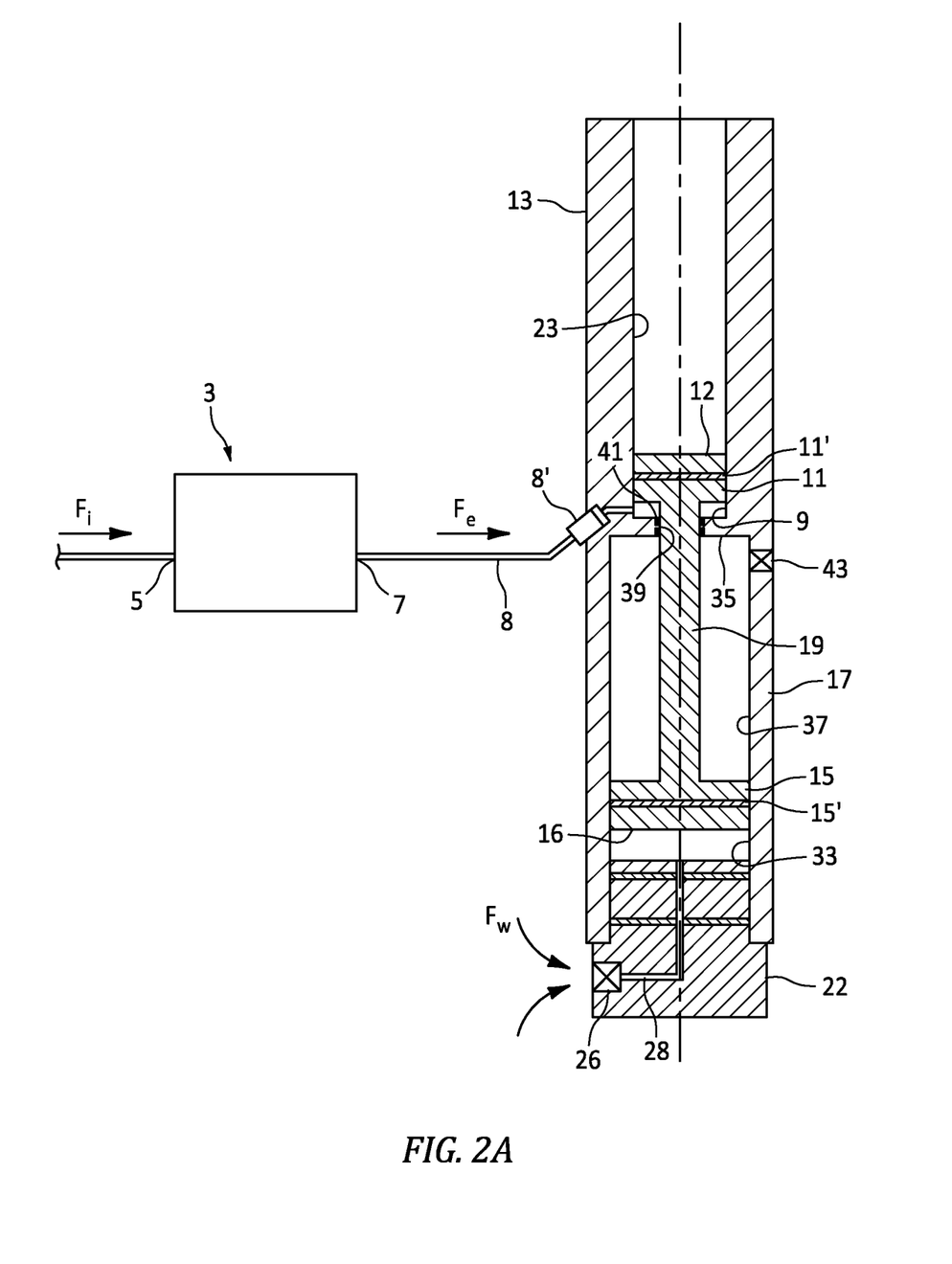
FIGS. 2A-2C show an alternative embodiment of the apparatus shown in FIGS. 1A-1C.
Figure 2B:
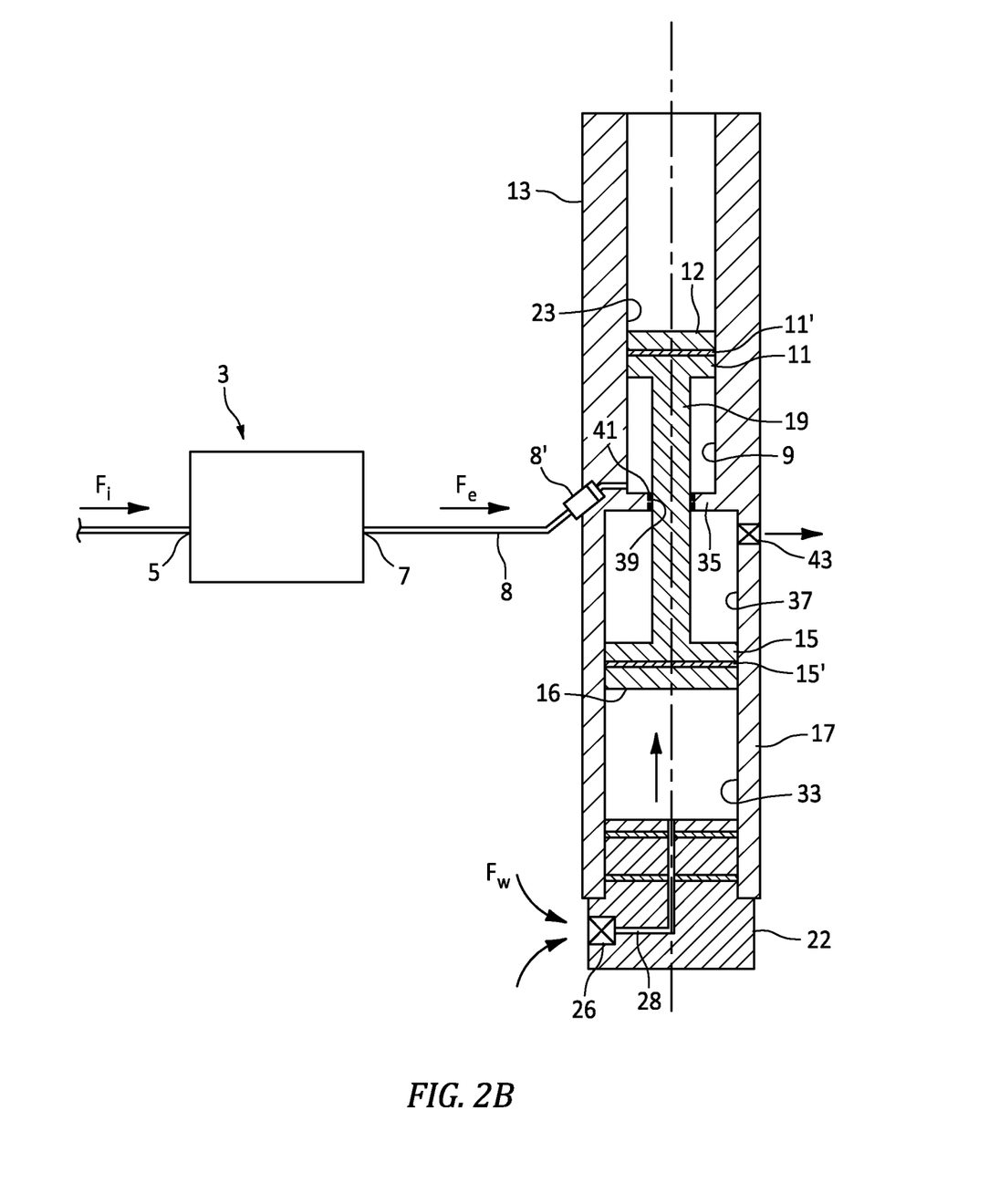
Figure 2C:
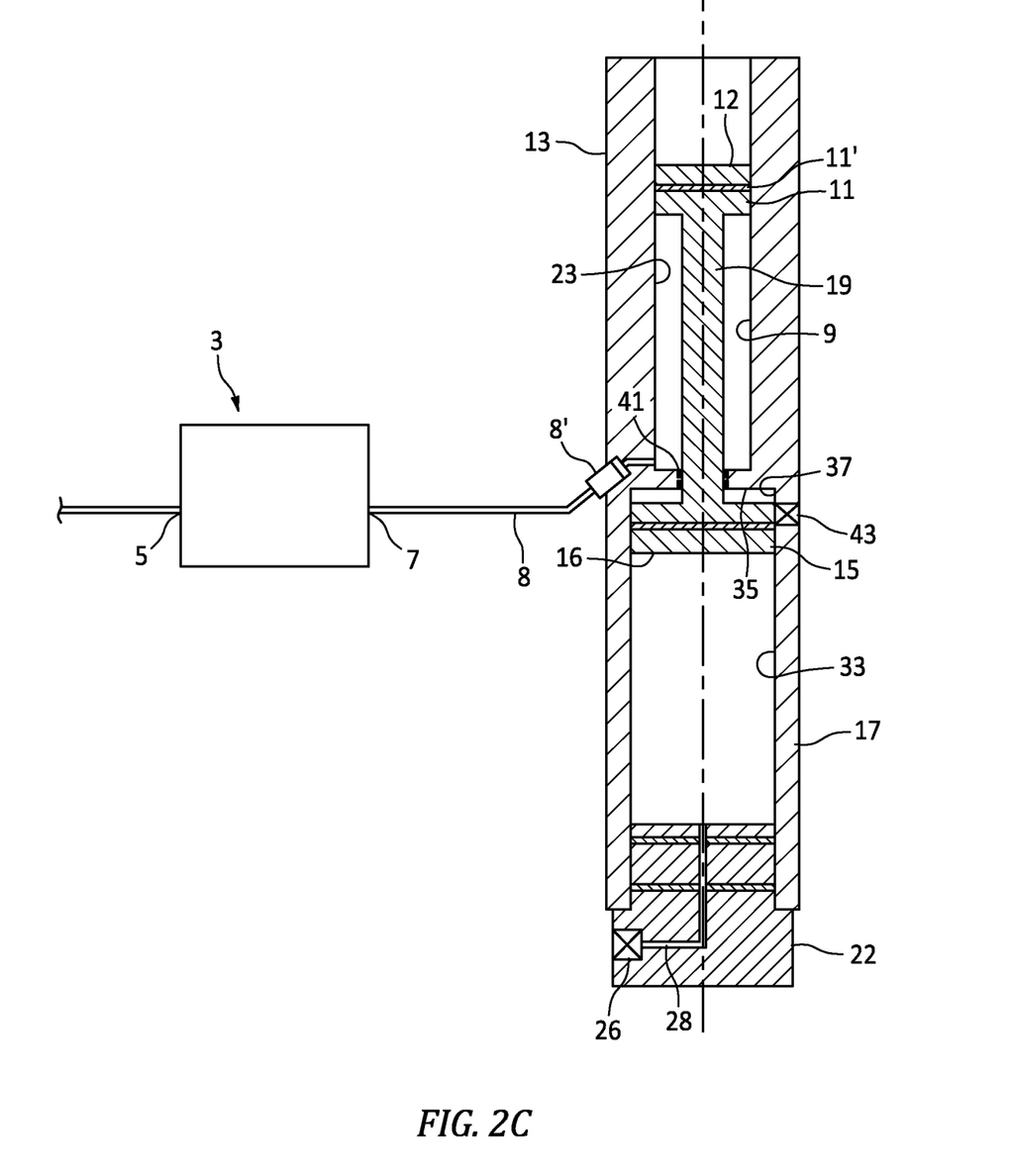

FIGS. 2A-2C show an alternative embodiment of the apparatus shown in FIG. 1A-1C.

In FIGS. 2A-2C, the area of the piston face 12 of the first piston 11 is smaller than the area of the piston face 16 of the second piston 15. In said figures, the piston rod 19 has a cross-sectional area which is smaller than the cross-sectional areas (and the piston faces 12, 16) of both the first piston 11 and the second piston 15.

A chamber wall 35 provides a partition between the dump chamber 9 and a partition-wall chamber 37 which is further defined by a portion of the piston rod 19, the second cylinder housing 17 and the second piston 15.

The chamber wall 35 is provided with an opening 39 which is complementarily adapted to the piston rod 19 and arranged coaxially with it. In the periphery of the opening 39, annular grooves are arranged for receiving a set of seals 41 (two shown in the figures) in order to provide, together with the piston rod 19, fluid-sealing between the partition-wall chamber 37 and the dump chamber 9.

A substantial difference between the apparatus 1 shown in FIGS. 1A-1C and the apparatus 1 shown in FIGS. 2A-2C is that the latter does not need a closable first hydraulic chamber 23 which, in the embodiment shown in FIGS. 1A-1C, initially contains a fluid at a pressure sufficient to counteract the movement of the piston arrangement 15, 19, 11. The first hydraulic chamber 23 may thus, but need not, be open towards the well as shown.

To be able to provide the desired inflow $F_i$ of a well-fluid sample into the sampling device 3, an end portion of the second cylinder housing 17 is provided with an end plug 22 which bears many similarities to the end plug 21 shown in FIGS. 1A-1C. But in FIG. 2A and FIG. 2B the fluid flow $F_W$ is from the well, via the valve 26 and the fluid channel 28 and to the second hydraulic chamber 33.

By controlling the degree of opening of the valve 26 in the end plug 22 shown in FIGS. 2A-2C, the upward movement of the piston arrangement 15, 19, 11 in the cylinder housings 17, 13 can be controlled in the same way as explained above in connection with FIG. 1A-1C.

A person skilled in the art will understand that the apparatus 1 according to the exemplary embodiment shown in FIGS. 2A-2C is run into the well with the piston arrangement 15, 19, 11 in the position shown in FIG. 2A. This means that the partition-wall chamber 37 is filled with a fluid, such as air or a liquid or a mixture thereof.

A draining device in the form of a valve 43 is arranged in a fluid-communication channel in the second cylinder housing 17, near the chamber wall 35.

The purpose of the valve 43 is to allow the fluid present in the partition-wall chamber 37 to be bled off as the volume of said chamber 37 is being reduced in consequence of the fluid flow $F_W$ into the second hydraulic chamber 33 and consequent upward movement of the piston 15. In the embodiment shown, the fluid is bled off towards the well.

The valve 43 thus enables a full movement of the piston arrangement 15, 19, 11 from the position which is shown in FIG. 2A to the position which is shown in FIG. 2C.

In its simplest form, the valve 43 is a one-way valve, but it is also conceivable for it to be a controllable valve. However, a controllable valve may complicate the apparatus 1 and is therefore not the primarily preferred solution.

Figure 3A:
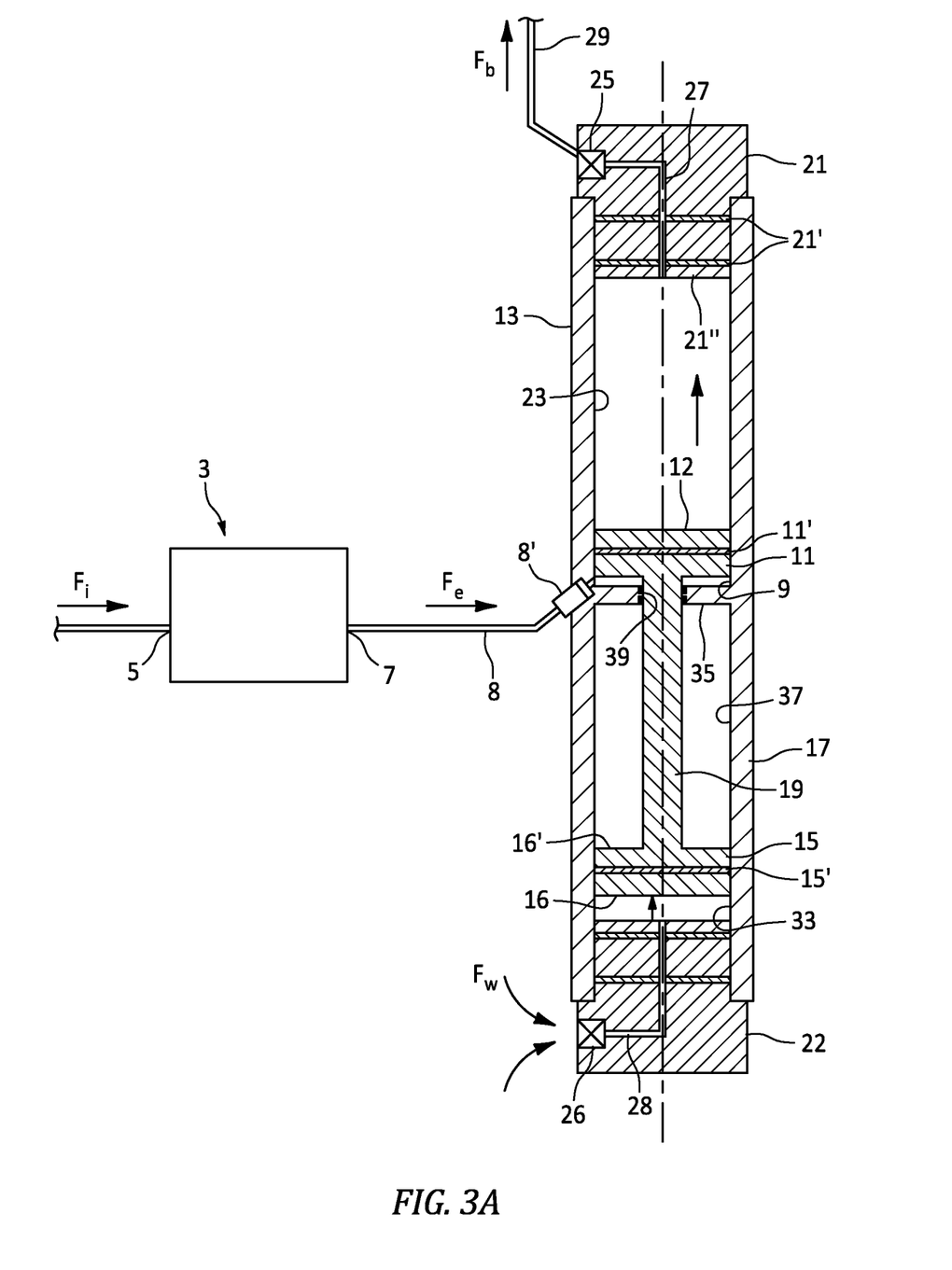
FIGS. 3A-3C show an alternative embodiment of the apparatus shown in FIGS. 1A-1C and FIGS. 2A-2C.
Figure 3B:
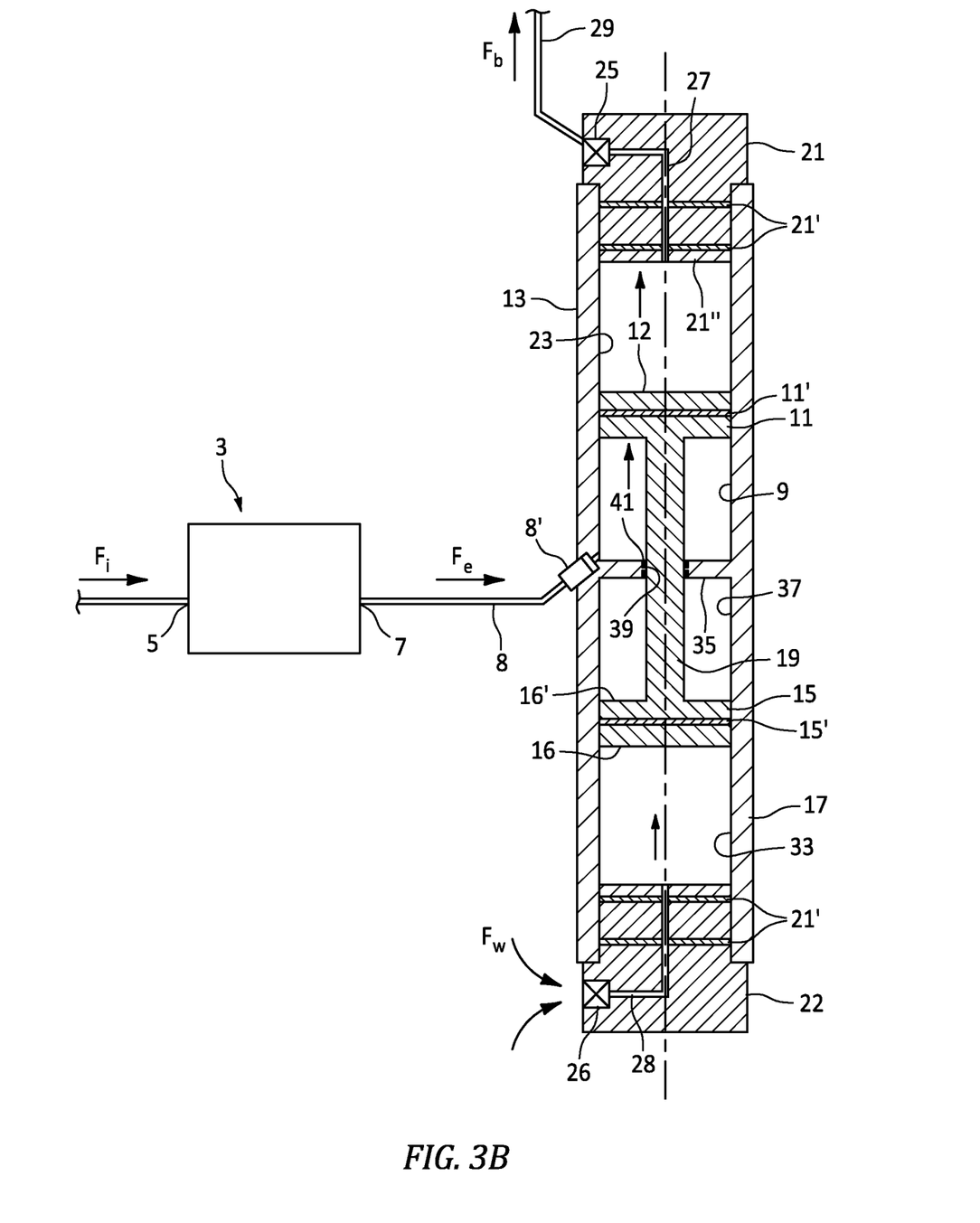
Figure 3C:
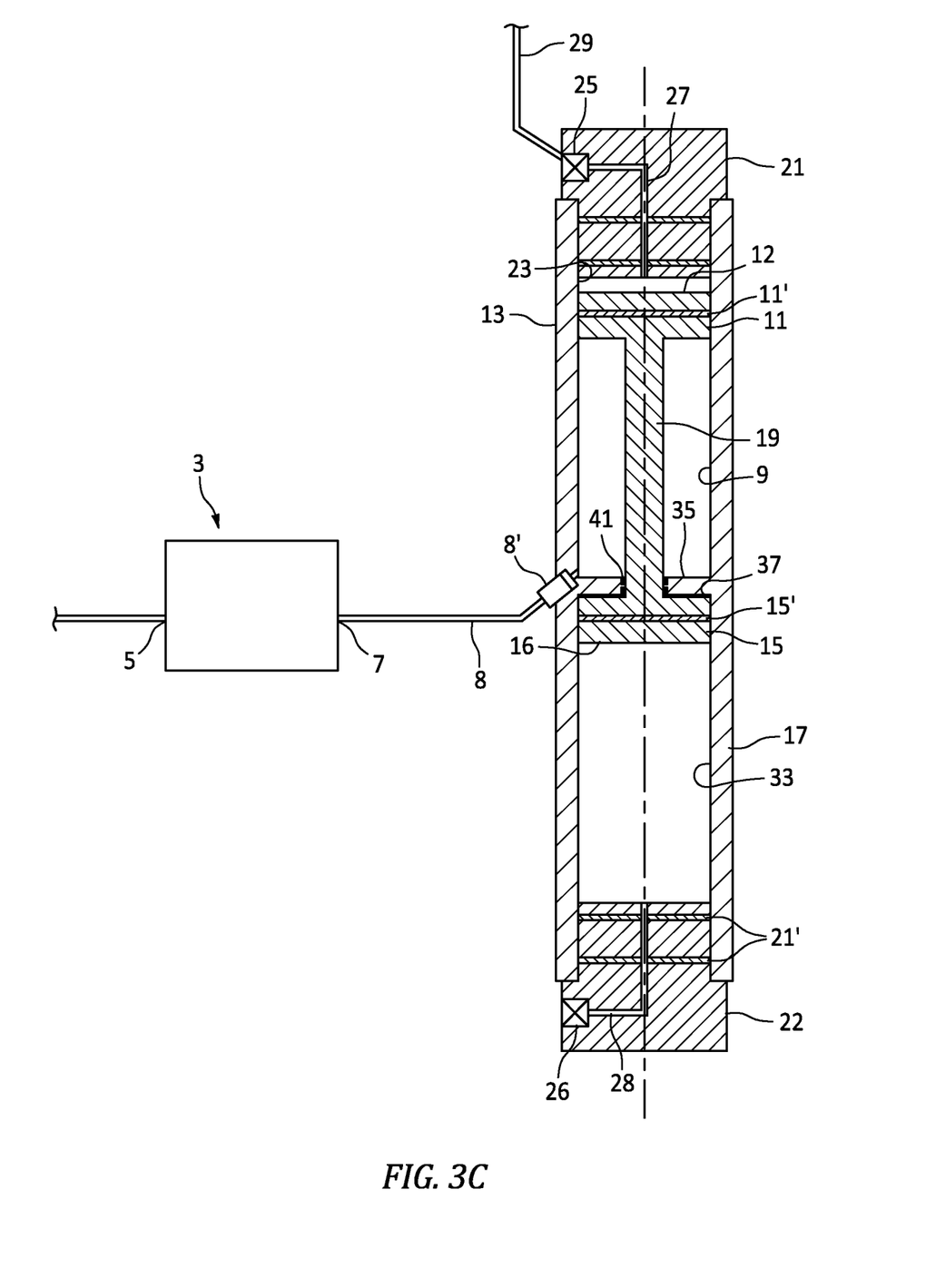

FIGS. 3A-3C show yet another alternative embodiment of the apparatus 1 shown in FIGS. 1A-1C and FIGS. 2A-2C.

In FIGS. 3A-3C, the area of the piston face 12 of the first piston 11 is equal to the area of the piston face 16 of the second piston 15. In said figures, the piston rod 19 has a cross-sectional area which is smaller than the cross-sectional area (and the piston faces 12, 16) of the first piston 11 and thus also that of the second piston 15.

In FIGS. 3A-3C, the apparatus 1 is provided with an end plug 21 and a valve 25 arranged in association with the first hydraulic chamber 23, in a manner corresponding to that shown in FIGS. 1A-1C. Further, the apparatus 1 is provided with a second end plug 22 and a valve 26 arranged in association with the second hydraulic chamber 33, in a manner corresponding to that shown in FIGS. 2A-2C. However, it will be understood that the latter end plug 22 and valve 26 are, in terms of operation, of the embodiment shown in FIGS. 3A-3C. In addition, it will be understood that the pistons 11, 15 do not need to be of the same size. For example, the piston arrangement 15, 19, 11 with associated cylinder housings 17, 13 shown in FIGS. 2A-2C could be used also for the arrangement shown in FIGS. 3A-3C.

In FIG. 3A, the piston arrangement 15, 19, 11 has been driven to a position in the apparatus 1 such that the dump chamber 9 has a smallest volume. This preparation or "charging/tensioning" of the apparatus 1 has been performed by supplying the first hydraulic chamber 23 with a pressurized fluid preferably before the apparatus 1 has been run into the well, so that the pressurized fluid supplied has driven the piston arrangement 15, 19, 11 from the position the apparatus has in FIG. 3C, possibly from a position between those shown in FIGS. 3C and 3A, for example from the position as shown in FIG. 3B to the position that is shown in FIG. 3A.

By such a displacement, the volume in the partition-wall chamber 37 mentioned above will increase. The partition-wall chamber 37 is fluid-tight in consequence of seals 41 in the chamber wall 35 and the seal 15' in the second piston 15. Thus, by said displacement, an underpressure will form in the partition-wall chamber 37. The underpressure will act against an internal piston face 16' of the second piston 15 and thus exert an upward force which acts against the force from the first piston 12 in consequence of the pressurized fluid in the first hydraulic chamber 23.

During the above-mentioned "charging" of the apparatus 1, fluid must be evacuated from the dump chamber 9. In the embodiment shown, in which an end plug 22 is arranged in association with the second hydraulic chamber 33 as well, the valve 26 must be in an open position so that fluid is also allowed to evacuate from the second hydraulic chamber 33.

Figure 3D:
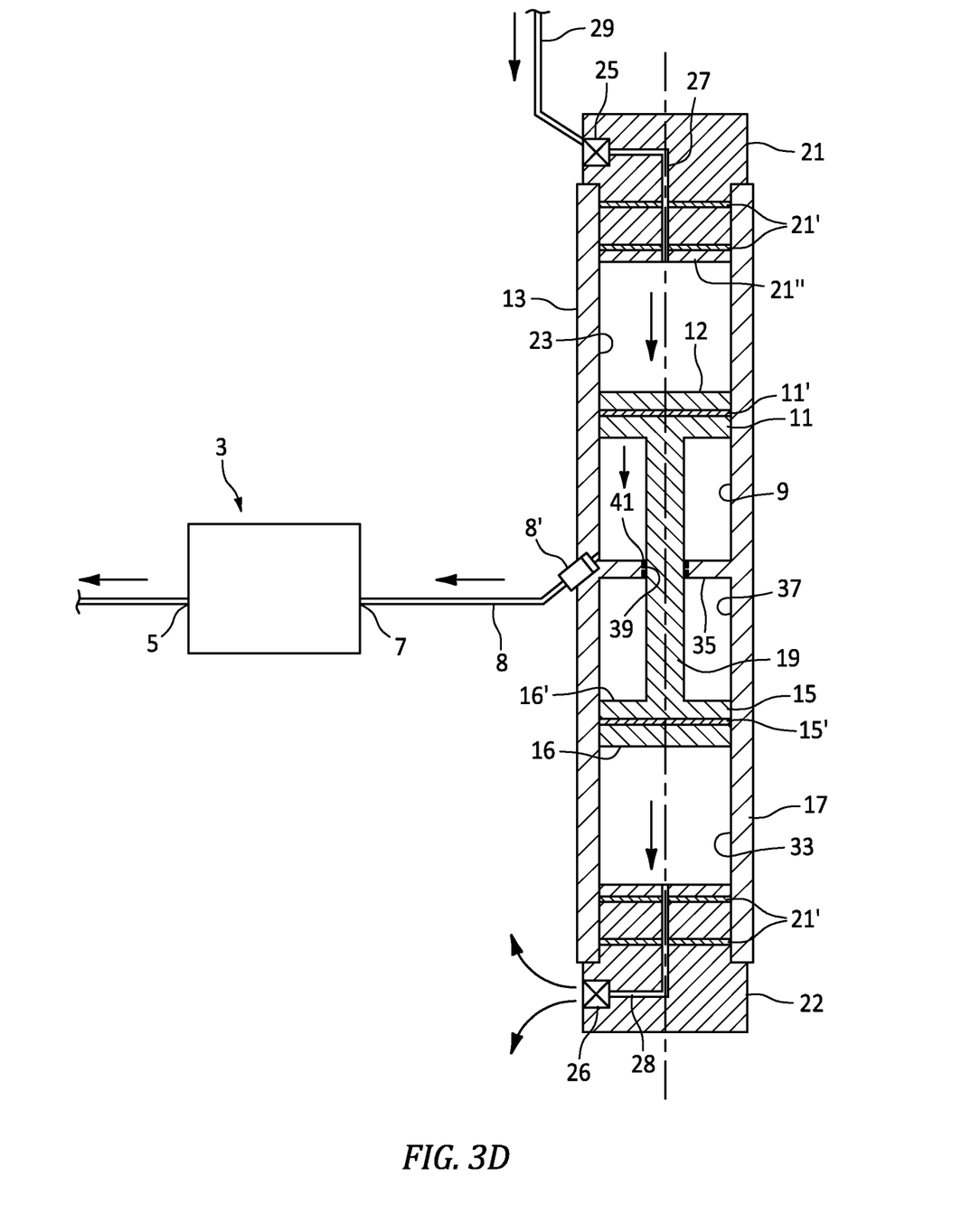
FIG. 3D shows the apparatus of FIGS. 3A-3C before it has been run into the well and while the piston arrangement is in the process of being placed the position which is shown in FIG. 3A.

FIG. 3d shows the fluid flows through the apparatus 1 during said "charging".

The valve 43 shown in FIGS. 2A-2C may be superfluous in the embodiment shown in FIGS. 3A-3C provided the "charging" is carried out from the position that is shown in FIG. 3C in which the second piston abuts against the chamber wall 35.

An advantage of arranging an end plug 22 with an associated valve 26 in association with the second hydraulic chamber 33 as well, is that the well fluid $F_w$ may selectively be prevented from entering the chamber 33, for example while the apparatus 1 is being run into the well. Thus, the fluid in the first hydraulic chamber 23 may be supplied at a pressure which is sufficient to overcome the underpressure in the partition-wall chamber 37.

The valve 26 may be used as a means of at least contributing to the control of the movement of the piston arrangement 15, 19, 11. By adjusting the valve 26 controlling the inflow of well fluid into the second hydraulic chamber 33 while, at the same time, the valve 25, which controls the bleed-off of the pressurized fluid in the first hydraulic chamber 23, is at least partially open, the fluid pressure in the second hydraulic chamber 33 may be controlled into being positive, contributing to an upward movement of the piston arrangement 15, 19, 11, that is, or negative, reducing or braking an upward movement of the piston arrangement 15, 19, 11, that is.

It is also conceivable that the valve 25 associated with the first hydraulic chamber 23 may be fully or partially closed, and that the rate of motion of the piston arrangement 15, 19, 11 and thereby the rate of volume change in the dump chamber 9 is controlled by means of the valve 26 controlling the inflow of well fluid into the second hydraulic chamber 33. A pressure increase will then occur in the first hydraulic chamber 23.

From the above it will be understood that the movement of the piston arrangement 15, 19, 11 is affected by the well fluid in the second hydraulic chamber 33.

It should be noted that all the above-mentioned embodiments illustrate the invention, but do not limit it, and persons skilled in the art may construct many alternative embodiments without departing from the scope of the independent claims. In the claims, reference numbers in brackets are not to be regarded as restrictive. The use of the verb "to comprise" and its different forms does not exclude the presence of elements or steps that are not mentioned in the claims. The indefinite article "a" or "an" before an element does not exclude the presence of several such elements.

What is claimed is:

1. A system for collecting a sample of well fluid from a well, comprising:
    a sampling device comprising a measuring device provided with at least one sensor, the sampling device having a fluid inlet and a fluid outlet; and
    an apparatus comprising:
        a first cylinder housing (FCH) having a FCH bore extending axially between a FCH first axial end and a FCH second axial end defined by an end face of an end plug attached to the FCH;
        a second cylinder housing (SCH) having a SCH bore extending axially between a SCH first axial end and a SCH second axial end;
        a first hydraulic piston disposed in the first cylinder housing, the first hydraulic piston having a first piston face side and a rod side;
        a second hydraulic piston disposed in the second cylinder housing, the second hydraulic piston having a second piston face side;
        wherein the first hydraulic piston is axially movable within the first cylinder housing, and the second hydraulic piston is axially movable within the second cylinder housing;
        a piston rod extending between the rod side of the first hydraulic piston and the second hydraulic piston;

a first hydraulic chamber disposed within the FCH bore and extending between the first piston face side of the first hydraulic piston and the end face of the end plug;

a dump chamber disposed within the FCH bore and extending between the rod side of the first hydraulic piston and the FCH first axial end;

a second hydraulic chamber disposed within the SCH bore and extending between the second piston face side of the second hydraulic piston and the SCH second axial end, the second hydraulic chamber having an opening disposed at the SCH second axial end, wherein the opening is a bore which extends through the SCH from the SCH second axial end to an exterior surface of the SCH and is configured for communication of said well fluid between the well and the second hydraulic chamber; and a valve in fluid communication with the first hydraulic chamber, the valve selectively actuatable between an open position and a closed position;

wherein the fluid outlet of the sampling device is in fluid communication with the dump chamber; and wherein the apparatus is configured such that axial movement of the piston rod, first hydraulic piston, and second hydraulic piston in a first direction causes the first hydraulic chamber to volumetrically decrease, and the dump chamber and second hydraulic chamber to volumetrically increase, and the volumetric increase in the dump chamber is operable to draw the sample of well fluid through the sampling device.

2. The system of claim 1, wherein the end plug includes the valve and the valve is in fluid communication with the first hydraulic chamber via a fluid channel extending through the end plug.

3. The system of claim 1, wherein a first area of a first piston face of the first hydraulic piston is larger than a second area of a second piston face of the second hydraulic piston.

4. The system of claim 1, wherein the at least one sensor includes a chromatograph selected from the group consisting of a gas chromatograph, a liquid chromatograph and an ion chromatograph, or a combination thereof.

5. The system of claim 1, wherein the sampling device comprises a tracer sample chamber which, by means of valves, is arranged to isolate the well fluid sample which is drawn from the well by means of the dump chamber.

6. The system of claim 1, wherein the sampling device comprises a tracer sample chamber, wherein the measuring device is placed upstream of the tracer sample chamber, and wherein the tracer sample chamber is arranged to be isolated from the measuring device and the dump chamber by means of valves.

7. The system of claim 6, wherein the tracer sample chamber includes a portion of a fluid line extending between an outlet portion of the sampling device and the dump chamber.

* * * * *